(12) United States Patent
Flagan

(10) Patent No.: US 6,905,029 B2
(45) Date of Patent: Jun. 14, 2005

(54) CROSS-FLOW DIFFERENTIAL MIGRATION CLASSIFIER

(75) Inventor: Richard C. Flagan, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/651,407

(22) Filed: Aug. 29, 2003

(65) Prior Publication Data

US 2004/0050756 A1 Mar. 18, 2004

Related U.S. Application Data

(60) Provisional application No. 60/410,070, filed on Sep. 12, 2002.

(51) Int. Cl.$^7$ .............................. B01D 61/00; B07B 7/00
(52) U.S. Cl. ........................ 209/210; 209/142; 209/143; 210/223; 210/644; 210/748; 95/28; 95/58; 95/71; 95/78; 96/3; 96/52; 96/64
(58) Field of Search ................................ 210/222, 223, 210/243, 321.6, 511, 634, 644, 695, 748; 95/28, 58, 67, 71, 78; 96/3, 27, 52, 64; 209/135, 138, 139.1, 142, 143, 210

(56) References Cited

U.S. PATENT DOCUMENTS

| | | | | | |
|---|---|---|---|---|---|
| 3,449,938 | A | * | 6/1969 | Giddings | 73/23.39 |
| 3,746,175 | A | * | 7/1973 | Markley | 210/321.64 |
| 4,075,092 | A | * | 2/1978 | White et al. | 210/646 |
| 4,597,947 | A | * | 7/1986 | Almaula | 422/191 |
| 5,193,688 | A | * | 3/1993 | Giddings | 209/155 |
| 5,242,594 | A | * | 9/1993 | Weinmann et al. | 210/634 |
| 6,109,119 | A | * | 8/2000 | Jiang et al. | 73/865.5 |

OTHER PUBLICATIONS

Adachi, M. et al., "High–efficiency unipolar aerosol charger using a radioactive alpha–source", *Journal of Aerosol Sci.*, 23(2): 123–137, Mar. 1992. (1–page Abstract).

Alonso, M. "Reducing the dilusional spreading rate of a Brownian particle by an appropriate non–uniform external force field", *J. Aerosol Sci.*, 33: pp. 439–450, Dec. 2002.

Chen Dr et al., Design and evaluation of a nanometer aerosol differential mobility analyzer (Nano–DNA), *J. Aerosol Sci.* 29: 497–509, Dec. 1998.

Collins Dr, et al., "Improved inversion of scanning DNA data", *Aerosol Sci. Technol.*, 36: 1–9, Dec. 2002.

Erikson, H. A., "The change of mobility of the positive ions in air with age", *Phys. Rev.* 18: 100–101, Dec. 1921.

(Continued)

*Primary Examiner*—Donald P Walsh
*Assistant Examiner*—Joseph Rodriguez
(74) *Attorney, Agent, or Firm*—Gates & Cooper LLP

(57) ABSTRACT

A method, system, apparatus, and article of manufacture provide a cross-flow migration classifier capable of separating particles. The classifier provides a channel through which a sample, having one or more particles, passes in a first direction, wherein the channel comprises two or more walls that are permeable to a flow of fluid. A cross-flow enters the channel through one of the permeable walls and exits through another of the permeable walls. An imposed field is applied in a second direction that is counter to the cross-flow and having an orthogonal component to the first direction. The imposed field causes one or more of the particles to migrate at a first velocity opposite and/or equal to a second velocity of the cross-flow. The particles that migrate opposite to the cross-flow are continuously discharged from the cross-flow migration classifier.

56 Claims, 4 Drawing Sheets

OTHER PUBLICATIONS

Han, H.S. et al., "A nanometer aerosol size analyzer (NASA) for rapid measurement of high concentration size distribution", *Journal Nanoparticle Research*, 2: 43–52, Mar. 2000, 1-page Abstract.

Knutson, E. O., "Aerosol classification by electrical mobility: apparatus, theory and applications", *J. Aerosol Sci.*, 6: 443–451, Dec. 1975.

Loscertales, I. G., "Drift differential mobility analyzer", *J. Aerosol Sci.* 29: 1117–1139, Feb., 1998.

Mirme, A., "Electric aerosol spectrometry", Doctoral thesis, Tartu University, Tartu, Estonia, Dec., 1994.

Rohmann, H., Methode zur messuing der grösse von schwebeteilchen, Z. *Phys.*, 17: 253–265, Jul. 1923 (Also attached is a 1-page summary of the document in English).

Rosel–Llompart J., et al., Sizing nanoparticles and ions with a short differential mobility analyzer, J. Aerosol Sci. 27: 695–719, Dec. 1996.

Russell, L. M, et al., "Asymmetric instrument response resulting from mixing effects in accelerated DMA–CPC measurements", *J. Aerosol Sci. Technol*, 23: 491–509, Dec., 1995.

Saldanha, A., "A Microfabricated Electrical Splitt System", Thesis, pp 1–96, May 2002.

Tammet, H., "Electrical aerosol spectrometer of Tartu University", *Atmospheric Res.*, 62: 315–324, Dec. 2002.

Wang J., et al., "Fast mixing condensation nucleus counter: Application to rapid scanning differential mobility analyzer measurements", *Aerosol Sci. Technol.* 36: 678–689, Jan., 2002.

Wang, S.C., et al., "Scanning Mobility Particle Sizer", *Aerosol Sci. Technol.*, 13: 230–240, Dec., 1990.

"Field–Flow Frationation"; http://www.analytical.chemsitry.helsinki.fi/research/instruments/fff/fffteor.html; 5pp, Jul. 23, 2003.

"Flow Field–Flow Fractionation"; http://www.wsc.monash.edu.au/fff/FlowFFF.html; 2pp, Jul. 21, 2003.

"Field–Flow Fractionation"; http://www.ytbioteknik.uu.se/sta/publ/fffschem.html; 2pp, Jul. 21, 2003.

"Differential Mobility Analyzer", Research at the Centre for Atmospheric Chemistry, http://www.cac.yorku.ca/people/mozurke/analyzer.htm; 2pp, Jul. 21, 2003.

"3.3.2 Understanding the Differential Mobility Analyzer"; http://www.itl.nist.gov/div898/pubs/ar/ar1996/node28.html; 2pp, Jul. 21, 2003.

"Field–Flow Fractionation Handbook", John Wiley & Sons, Inc., Publication, 18pp, Dec. 2000.

Product Brochure, TSI®, Model 3080–Series Electrostatic Classifiers, Dec., 2001.

\* cited by examiner

PRIOR ART

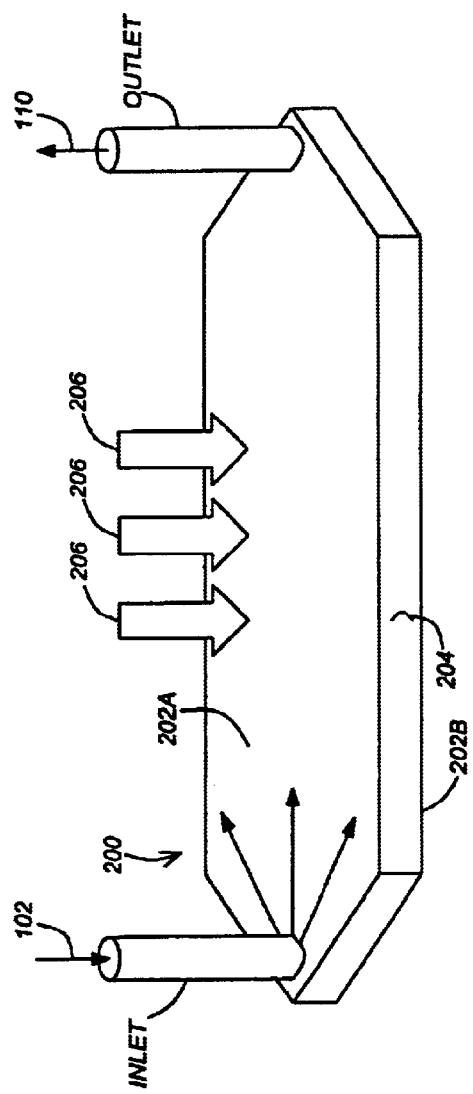
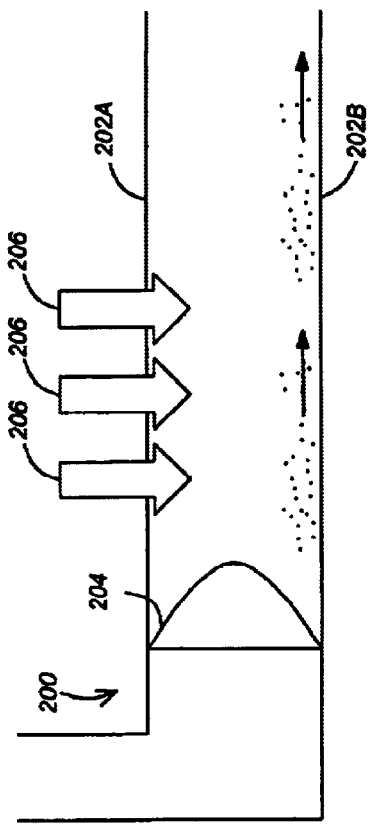
PRIOR ART

CROSS-FLOW DIFFERENTIAL MIGRATION CLASSIFIER

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 60/410,070, filed on Sep. 12, 2002, by Richard C. Flagan, entitled "CROSS-FLOW DIFFERENTIAL ELECTRICAL MOBILITY CLASSIFIER,".

BACKGROUND OF THE INVENTION

1. Field of the Invention

The present invention relates generally to separating and measuring particles (including molecules) (e.g., in gases [aerosols] or in liquids [colloids or suspensions]), and in particular, to using a cross-flow differential migration classifier to separate and/or measure particles.

2. Description of the Related Art

The need to separate and measure particles (e.g., particles contained in gases [aerosols] [also referred to as atmospheric ultrafine particles] or in liquids [colloids or suspensions]) according to size or other parameters spans a wide range of science and technology. Many different separation/measurement techniques have been developed, but each suffers serious drawbacks and limitations, particularly in the domain of continuous separations. For example, prior art separation techniques are limited in their ability to provide/separate a high percentage of the total desired particles in a sample or to provide/separate particles within a desired size range. Such problems may be better understood by describing prior art separation techniques.

The ability to extract particles within a narrow interval of property values may enable measurements of the characteristics of a particulate system. For example, particle size distribution characteristics may be measured/determined by a detector that measures the number of mass of particles contained within a sample of classified/separated particles. In another example, a chemical analysis system may be employed as a detector to measure the composition distribution with respect to size. A detection system capable of determining the number or activity of particles of biological origin may enable pathogen detection. Further, a suitable separation system may enable preparations of bulk quantities of separated/classified materials for a wide range of applications.

As described above, a number of different separation/measurement techniques have been developed for particles contained in gases (aerosols) or liquids (colloids or suspensions), but each suffers serious drawbacks and limitations. Common prior art techniques that may measure particles are a condensation particle counter (CPC) and a differential mobility analyzer (DMA). A CPC may be used to determine the number concentration of particles larger than a critical size (e.g., 2.5 to 15 nm) but with a limited resolution of the particle size distribution. A DMA may enable size distribution measurements for particles in the submicron size range. By combining a DMA with a particle detector, such as the CPC, and stepping through a sequence of particle sizes, the combination may measure particle size distributions in a matter of minutes. By eliminating the delays between steps by scanning through particle size, measurements may be accelerated in a system that may be referred to as the scanning mobility particle sizer (SMPS™) or scanning electrical mobility spectrometer (SEMS).

A differential mobility analyzer (DMA) as illustrated in FIG. 1 is a classifier for charged particles contained in a gas (i.e., it sorts particles with respect to their electrical mobilities—a parameter that can be related to the particle size). A DMA is often used to sort/measure sub-micrometer aerosol particles according to size while keeping them suspended in air. First an electric charge is applied to the aerosol particles. In this regard, it is difficult to put more than one charge on small particles and as a result, most of the particles will either be uncharged or have a single charge. In the common implementations, although negatively charged particles can be classified by reversing the polarity on the DMA, only the positively charged particles are sorted by the DMA, all others may be lost.

After charging, the aerosol sample flow 102 containing the charged particles (referred to as polydisperse) are introduced into the DMA containing an electric field. In this regard, the electric field is created by two electrodes (e.g., center rod 104 and wall(s) 106A and 106B). The center rod 104 may be an inner cylinder that is connected to a negative power supply. The charged particles 102 are introduced close to one of the electrodes (e.g., walls 106A and 106B), while a larger flow of clean, particle free gas 108 (referred to as sheath air) is introduced to fill the remaining gap.

The particles within the DMA are allowed to migrate into the clean sheath air flow 108 under the influence of the electric field. Accordingly, the electric field applied between the two electrodes 104 and 106A/106B causes the charged particles of the appropriate polarity to migrate toward the electrode 104 on the clean-gas side of the flow channel. In this regard, particles with negative charge may be repelled towards and deposited on the outer wall(s) 106A/106B. Similarly, particles with a positive charge may migrate towards the negatively charged center rod 104. The rate of migration depends on the electrical mobility of the particles. Mobility in turn, depends on both the size and electrical charge of the particle. If all of the particles have the same charge, then particles of a given mobility are the same size. Since the particles migrate at different rates, they are spread out through the sheath air 108 according to mobility. In this regard, withdrawing a portion of the sheath air flow 108 separates a narrow range of particle mobilities from the rest of the aerosol 102.

At a downstream position, a classified-sample flow 110 (also referred to as monodisperse aerosol) is extracted from the clean gas side of the channel. The classified-sample flow 110 contains those particles that migrated across the channel during the time required for flow from the entrance port to the classified-sample extraction port, but that did not strike, and adhere to either the clean-side electrode 104 or the wall(s) 106A/106B. The uncharged particles exit the DMA with the excess air 112. Thus, the particles are separated according to electrical mobility, which is defined as the migration velocity per unit of applied field strength.

Thus, as described above, a small monodisperse aerosol flow 110 drawn through a slot in the center electrode 104 downstream from the sample 102 entrance slot extracts those particles that migrate across the gap in the time required to flow down the length of the column of the DMA. Particles of higher or lower mobilities either deposit on the walls of the classifier or are discharged with the major flow 112 passing between the electrodes 104 and 106A/106B and bypassing the sample 110 extraction slot.

DMA separation can be performed at a constant applied field strength or a time-varying applied field strength (i.e., the charge between electrodes 104 and 106A/106B may be constant or vary over time). When the field is constant, a steady-flow of mobility classified particles may be contained in the classified sample flow 110. In this regard, classified particle samples may be prepared for a wide-range of applications, including calibration of particle measurement instruments, measurements of mobility (or size) dependent properties, and direct applications of particles with tightly controlled properties. In a time-varying application, the mobility of the particles varies with time. Thus, the distribution of particles within the sampled aerosol 102 with respect to the particle mobility may be rapidly measured.

Given knowledge of the relationship between the particle mobility and size, measurements taken in a DMA can be translated into a high-resolution particle size distribution. The ability to resolve particle mobility in this method is determined by the ratio of the clean sheath gas 108 flow rate to the flow rate of the entering aerosol 102 flow. The throughput of classified particles 110 is determined by the product of the number of concentration of particles of appropriate size, the volumetric flow rate of the incoming aerosol 102, and the probability that an entering aerosol particle 102 will carry the appropriate charge.

Thus, the ability of the DMA to separate particles of different mobilities is determined by the ratio of the sum of the incoming aerosol and outgoing classified sample volumetric flowrates to the sum of the sheath and exhaust flows, i.e., $$\beta = \frac{Q_a + Q_c}{Q_{sh} + Q_e}$$

and the tendency of particles to diffuse away from their mean trajectory. Considering the conventional DMA designs in which the distance in the streamwise direction is large compared to the distance between electrodes 104 and 106A/106B, and noting that the particle diffusivities are generally small, diffusion in the cross-stream direction dominates.

The variance in the cross-stream position of the particles due to Brownian diffusion is:

$$\sigma^2 = 2Dt$$

where D is the Brownian diffusivity of the particles. Thus, the relative variation in the cross-stream location upon migration across the gap (separation distance b) between electrodes 104 and 106A/106B at the average migration time ($\tau_{mig} = b/v_{mig}$) becomes:

$$\frac{\sigma}{b} = \sqrt{\frac{2D}{bv_{mig}}},$$

where $v_{mig} = ZE$ is the migration velocity of a particle of electrical mobility Z, and E is the applied electric field strength. The dimensionless quantity $bv_{mig}/D$ describes the relative importance of transport by electrophoretic migration to that by Brownian diffusion. It has the form of a Peclet number, and has been labeled by migration Peclet number, $Pe_{mig} = bv_{mig}/D$.

The diffusivity and electrical mobility can both be related to the mechanical mobility of the particle (B, the ratio of the terminal migration velocity to the applied force that causes the particle to migrate), i.e., $$D = BkT$$

$$Z = qB,$$

where k is the Boltzmann constant, T is the temperature, and q is the charge on the particle. The electric field can be written as:

$$E = \frac{\Phi}{b} f(\text{geometry}),$$

where the dimensionless function of the geometry, $f$(geometry), accounts for any nonuniformities in the electric field across the gap between the electrodes 104 and 106A/106B, $\Phi$ is the applied voltage difference between the electrodes 104 and 106A/106B, and b is the separation distance between the electrodes 104 and 106A/106B.

Thus, the standard deviation in the cross-stream position after the mean migration time is:

$$\frac{\sigma}{b} \approx \sqrt{\frac{2kT}{q\Phi}} = \sqrt{\frac{2}{Pe_{mig}}}$$

The ability of a DMA to resolve small differences in particle mobilities can be characterized in terms of the ratio of the characteristic mobility of the particles that are transmitted to the breadth of the mobility range that is actually transmitted. Specifically, the resolving power or resolution may be defined at the mobility of the particles that are transmitted with the highest probability to the difference in mobilities between the highest and lowest mobilities that are transmitted with one-half of that probability. In the limit of nondiffusive particles, the resolution is:

$$R_{nd} = \beta^{-1}.$$

For highly diffusive particles, the resolution may scale as:

$$R_d = f(\text{geometry})\Phi^{\frac{1}{2}}$$

Thus, at high operating voltages, the relative amounts of particle-laden and particle-free flows determines the resolution, while at low voltages, it is the operating voltage that determines the resolution. For a number of existing differential mobility analyzers, the differences in performance of the ideal instruments is small, although nonidealities in instrument design and construction may lead to dramatic differences in the performance in the high voltage limit.

Various techniques have attempted to improve the limiting resolution. For example, in one technique, reducing the length to gap ratio to near unity may optimize the performance of the DMA design at a fixed Re. Such an approach may achieve modest improvements in the geometry factor in $$R_d = f(\text{geometry})V^{\frac{1}{2}},$$

while maximizing the operating voltage, thereby maximizing $Pe_{mig}$, i.e., the approach is equivalent to maximizing $Pe_{mig}$ while recognizing the constraints that must be imposed on the flow Reynolds number to avoid deleterious turbulence.

In another technique, the imposition of an electric field in the DMA column in the streamwise direction may increase the resolution beyond that predicted by the simple analysis described above. Further, the incorporation of inclined grids within the classification region may be a viable way to realize some gains. Also, substantial improvements in resolution at a given voltage may be achieved by appropriate use of nonuniform electric fields. Specifically, the DMA resolution may be enhanced by inducing migration from the inner electrode to the outer one in a cylindrical DMA. Both approaches have the potential to improve resolution beyond the limits suggested, although practical implementations have not yet been demonstrated.

Gains may also be maximized by reducing the radius of the inner electrode relative to that of the outer one in a cylindrical DMA. Further, gains may also be maximized by causing the particles to migrate across the DMA with no streamwise separation between the aerosol inlet and outlet ports.

In view of the above, to produce an unambiguous relationship between the particle mobility and the particle size, most applications of the DMA charge the particles by exposure to an ambipolar mixture of positive and negative gas ions (e.g., produced by exposure to a radioisotope or produced by corona discharge). As described above, under typical ambient conditions, charging particles in this manner may result in a small fraction of particles carrying a single charge. Of the singly charged particles, approximately one-half will possess appropriate polarity for classification, further reducing the fraction of sampled particles that will be included in the classified-sample flow 110.

While this prior art approach has the advantage of producing a well-characterized charge distribution, the approach results in most particles within a size range of interest being lost within the classification region. In this regard, when particles are above a certain size (e.g., 100 nm) and in typical ambient temperature and pressure air, the number of particles carrying multiple charges becomes substantial. As the particle size further increases (e.g., beyond 1 μm in diameter), multiple charging is so substantial that the prior art approach is rarely extended beyond such particle sizes.

Alternate charging approaches have been employed to increase the fraction of small particles charged or to produce a more consistent relationship between the mobility of super-micron particles and the particle size. Regardless of the charging method employed, the aerosol 102 flow rate through the DMA may be limited by the need to maintain laminar flow (e.g., to efficiently separate/classify the particles). Such limitations therefore limit the value of prior art DMAs in the preparation of quantities of classified particles for scientific or technological applications. The transition from laminar to turbulent flow may be evaluated and/or determined by the flow Reynolds number:

$$Re = \frac{\rho U L}{\mu},$$

where ρ is the density, U is the velocity, L is the characteristic length of the flow system, and μ is the viscosity.

The Reynolds number must be kept below a critical value to maintain laminar flow. The clean sheath gas 108 flow through the DMA must be larger than the aerosol sample 102 flow to achieve high mobility/size resolution. Accordingly, the flow of aerosol 102 that can be processed is only a small fraction of that which might be processed through the channel in the absence of the sheath flow 108. Since the product of the characteristic length scale (L) of the device and the gas velocity (U) determines the magnitude of the Reynolds number, there is a severe constraint on the throughput of the DMA.

Prior art DMAs have not generally been applied to the classification of particles in liquid for a number of reasons. The presence of a fluid phase that is of comparable density to the particles drastically alters the forces of interaction between the particles and the wall(s) 106A/106B of the classifier. For particles in gases, van der Waals forces are sufficiently strong that once a particle reaches a wall 106A/106B, it adheres strongly. With liquids, the van der Waals forces are weaker. Additionally, molecular interactions may even cause particles to be repelled from the wall. However, in either gases or liquids, particles may continue to move along the wall(s) 106A/106B to be included in the classified sample flow, although clever flow designs could enable the wall layer to be removed prior to extracting the classified-sample flow 110.

During the separation of particles using a DMA, cross-flow mobility fractionation may be observed. In other words, the particles are separated based on their ability to migrate which provides fractionation in cross-flow like patterns within the DMA channel. However, instead of cross-flow mobility fractionation, the separation of particles in liquids has taken advantage of the ability of particles to continue to migrate even in close proximity to a surface. For example, a technique that takes advantage of such an ability is referred to as Field Flow Fractionation (FFF) as illustrated in FIGS. 2A and 2B. In FFF, particles 102 are passed in a laminar flow through a narrow channel 200 between appropriate surfaces 202A and 202B. The laminar flow produces a parabolic velocity profile 204, with the streamwise velocity peaking at the center of the channel 200 and dropping to zero near the walls 202A and 202B.

Brownian diffusion causes the particles 102 to migrate randomly across the narrow channel 200. While in the center of the channel 200, particles 102 are carried down the channel 200 at high velocities. However, when the particles 102 are near the wall(s) 202A/202B, the particles move down the channel 200 at much lower velocities. If a field 206 (e.g., gravity, electrical, magnetic, etc.) is applied perpendicular to the direction of flow, particles 102 may be pushed near the wall 202B. Brownian diffusion enables particles to sample different regions of the flow, although the time that different particles will spend in different regions will depend on their diffusivities and on the forces that the applied field applies to them. Thus, a pulse of particles 102 having a range of diffusivities that are introduced into the channel 200 flow will separate in time as they are carried down the channel 200.

A bias in the position of the particles 102 within the flow channel 200 can also be affected by introducing or extracting a flow through one or both walls (e.g., wall 202A or 202B). This technique is called flow Field Flow Fractionation (fFFF). fFFF is capable of separating colloidal particles over sizes ranging from nanometers to many micrometers, and with quite high resolution. A transverse field 206 (i.e., parallel to the surfaces but perpendicular to the direction of flow) can in some cases enable continuous separation.

Thus, as described above, in FFF, the transit time of particles down a narrow channel 200 varies according to the extent to which different particles sample the flow within the channel 200. A field 206 applied across the narrow dimension of the channel drives particles toward one surface (e.g., wall 202B) where the streamwise velocity is low.

An additional variant of FFF referred to as SPLITT (split flow thin fractionation) may also be used to separate particles continuously. In SPLITT, the flow channel has a carrier inlet, a sample inlet, and two outlets. The applied field causes particles to migrate to different regions of the flow so that the flow may be separated into the two outlet streams. The result provides a coarse separation into two fractions—one with particles larger than a given size, and the other with smaller particles. Multiple splitters may also be used to increase the number of fractions. However, the number of fractions may remain small and the range of migration velocities included in any fraction may remain relatively large.

Various other methods have been used to measure ultrafine particle size distributions. For example, the electrical aerosol analyzer was a predecessor to the DMA, with far more limited size resolution and sensitivity. A diffusion battery uses a CPC to count particles that pass through a screen or capillary on which the smaller particles deposit by Brownian diffusion. By using a range of such diffusional barriers, the diffusion battery can be used to determine particle size distribution. However, the particle size distribution may be determined with a resolution that is lower than that of SMPS. Cascade impactors may separate aerosol particles into discrete fractions that are collected on a substrate. A relatively new configuration that does enable continuous measurements is the electrical low pressure impactor (ELPI). In this instrument, the particles may be charged before introduction into the impactor. The deposited current provides an indication of the numbers of particles collected on the various impaction stages.

As described above, the CPC may be used to determine the concentration of particles larger than a critical size. To perform such a determination, the CPC condenses a vapor on the particles to grow them to a size that is easily detected optically, typically greater than 1 $\mu$m in diameter. The resulting large particles can be counted with near 100% efficiency. The absolute counting efficiency of the CPC is determined by the extent to which the particles are lost by Brownian diffusion to surfaces prior to growth, and by the efficiency of activation. The surface tension of a liquid increases the vapor pressure over a small droplet, so that there is a minimum particle size that can be activated at a given supersaturation. The smallest particles activated by commercially available CPCs range from 2.5 to about 15 nm diameter, depending on the working fluid employed and the difference in temperatures between the vapor source and the condenser regions of the instrument. This sensitivity to supersaturation has been used to achieve limited size resolution in CPC measurements.

Parallel CPCs operated at different supersaturations to detect particles larger than different threshold sizes may also be employed. For example, modest size resolution from a single CPC may be obtained by analyzing the intensity of light scattered by droplets grown on particles that are close to the threshold for activation.

In view of the above, what is needed is a method, apparatus, and article of manufacture for continuously separating particles of varying sizes where the classified-sample flow 110 constitutes a higher percentage of the total flow 102 entering a fractionator/DMA and is a larger flow than that of the prior art.

SUMMARY OF THE INVENTION

Differential mobility analyzers (DMAs) and field flow fractionators are used in the prior art to separate and/or classify particles distributed within a sample. However, various limitations exist for using the prior art techniques including but not limited to production of a low particle/sample separation ratio, reduced capabilities for separations of particles in a liquid, and a low throughput of a classified sample.

To avoid these and other disadvantages of the prior art, one or more embodiments of the invention provide a cross-flow differential migration classifier that may be used to classify/separate samples in a variety of forms. Particles in a sample are introduced to a channel that has permeable walls. A cross flow enters the channel through one of the permeable walls (and exits through another of the walls). In contrast to field flow fractionation, the walls are designed so that particles may either pass through the openings in the wall or adhere to it. The cross flow would thus normally cause all of the particles in the channel to be lost from the flow through the channel.

To counteract this effect, an imposed field is introduced that causes some particles to migrate counter to the flow. The imposed field is counter to the cross-flow and is orthogonal (or has an orthogonal component) to the direction of the sample flow. Thus, the imposed field causes appropriate particles in the sample to remain entrained in the sample flow and to continue to migrate between the walls of the channel.

The imposed field may take a variety of forms such as an electric field (for charged particles), horizontal or inclined orientation of the channel to cause gravitational sedimentation of large particles, a magnetic field for magnetic particles, temperature gradient to induce thermophoretic diffusion, etc.

In addition, if the particles are allowed to migrate through the wall, provision may be taken to remove the particles from the cross flow so that that fluid can be recirculated. Such provisions may include filtration of the fluid after it exits the channel, and increasing the field strength or reducing the flow velocity (by increasing the cross sectional area of the flow) on the inlet side of the channel so that the applied field causes particles to continue to migrate until they reach a surface where they adhere or are otherwise removed from the fluid.

BRIEF DESCRIPTION OF THE DRAWINGS

Referring now to the drawings in which like reference numbers represent corresponding parts throughout:

FIGS. 2A and 2B illustrate a field flow fractionator of the prior art;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Details of Cross Flow Migration Classifier

One or more embodiments of the invention provide a method, apparatus, and article of manufacture that enables the continuous separation of particular aerosol, colloidal, and/or suspension particles (e.g., in an aqueous or non-aqueous environment) from a larger input flow. Embodiments introduce simplifications that may dramatically reduce the cost of the separation, by enabling smaller and/or simpler instruments to be made, or to increase the throughput by enabling larger separators to be fabricated.

Figure 1:
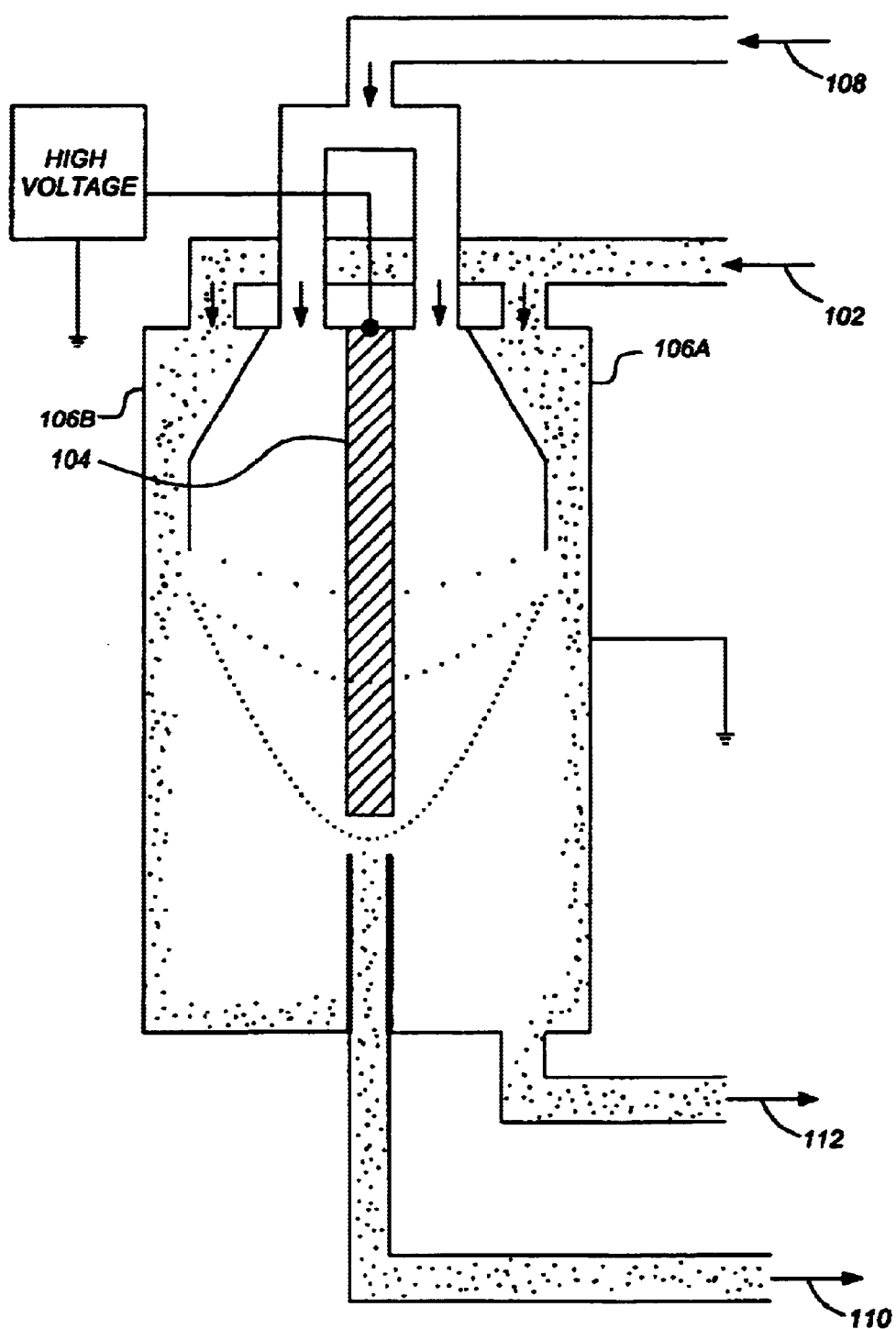
FIG. 1 illustrates a differential mobility analyzer (DMA) of the prior art.
Figure 3A:
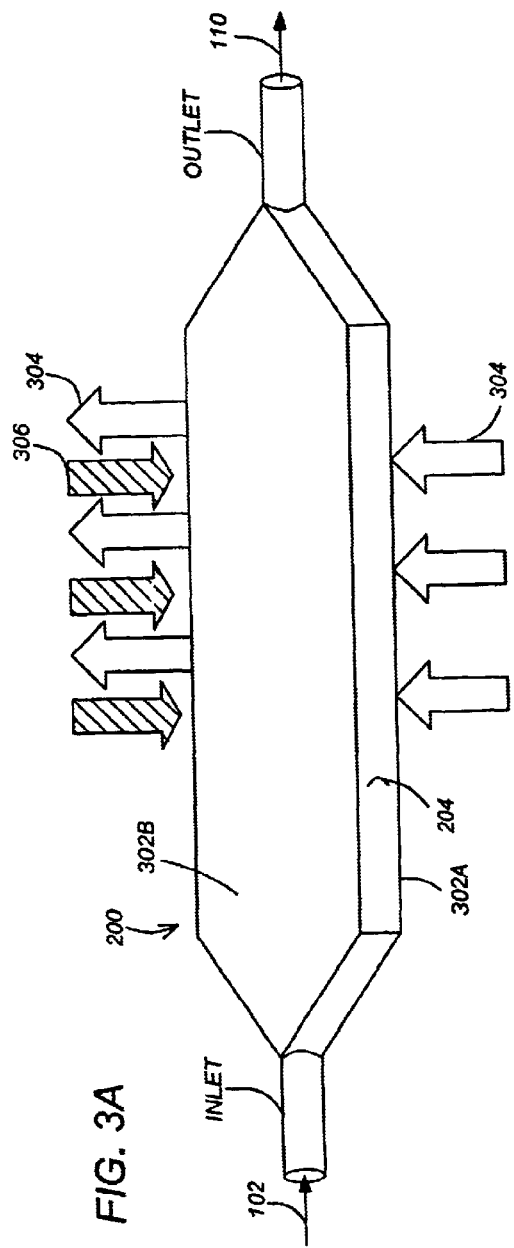
FIGS. 3A and 3B illustrate a differential migration classifier in accordance with one or more embodiments of the invention.
Figure 3B:
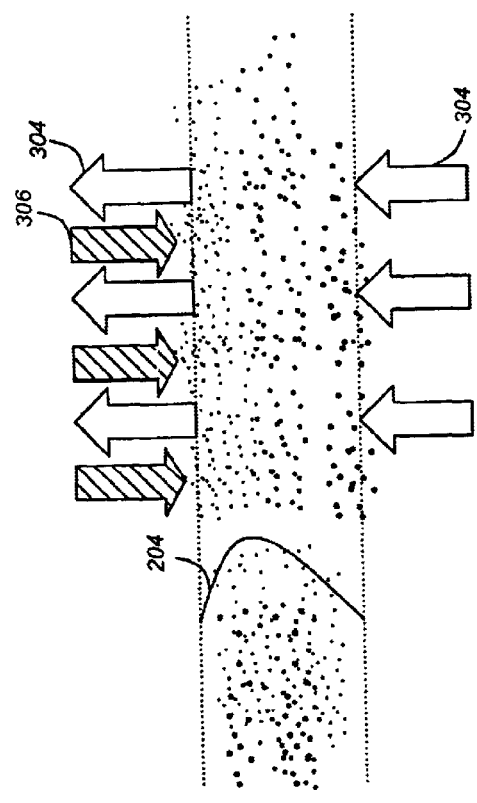

FIGS. 3A and 3B illustrates a differential migration classifier in accordance with one or more embodiments of the invention. The particulate laden sample 102 is pumped/injected into a channel 200. The sample 102 then passes through two walls 302A and 302B of the channel 200 that are permeable (e.g., to the flow of gases or liquids). When separating/measuring particles in a liquid, examples of the permeable walls 302A/302B may include filters that capture particles, or a honeycomb or porous material (e.g., a porous metal such as sintered metal) that may allow the particles to pass through it. A cross-flow 304 entering the channel 200 through one wall 302A, and exiting through the opposing wall 302B is imposed.

This cross-flow 304 would potentially cause all aerosol particles to be lost through the walls 302B or by deposition onto them. To counteract this effect, an imposed field 306 causes some particles to migrate counter to the cross-flow 304. Those particles that migrate at a velocity that is approximately equal, but opposite to the cross-flow 304 will remain entrained in the particle gas 102 and be conveyed between the walls 302A and 302B between the entrance and exit regions. Thus, if the cross flow 304 is exactly equal but opposite to the particle migration velocity, velocity particles will be carried straight though the channel 200. Particles that migrate at higher or lower velocities may therefore be transmitted to one of the two porous walls 302A/302B where they may either pass through or deposit, depending upon the construction. Because the particles whose migration velocities approximately or exactly counter the cross-flow 304 velocity move directly through the channel 200, while other particles are lost by deposition on or permeation through the channel walls 302A/302B, the invention may enable continuous separation.

Accordingly, the undesirable particles that do not remain entrained in the channel 200 and/or flow, are lost through the walls 302A and 302B or disposed of (e.g., by deposition on and adhesion to the walls 302A and 302B). In this regard, the desirable particles do not migrate across the channel 200 but remain entrained in the channel 200. In addition, some particles migrating at slightly higher or lower migration velocities may remain in the channel due to the finite sample flow rate along the channel. Particle diffusion may extend the range of particle migration velocities that continues to the channel exit, and cause some particles that migrate at the ideal velocity to be lost from the flow. Thus, the entire flow that remains entrained in the channel 200 exits the channel to provide a continuous classified-sample flow 110. Additionally, with prior art techniques, the classified-sample flow 110 likely contained numerous particles that remained in the channel 200 (e.g., moved along the walls 302A and 302B of the channel 200).

The imposed field 306 can take several forms. To classify fine particles, the particles would first be charged, and then classified in an imposed electrical field. Larger particles might be classified by altering the angle of inclination of the channel 200 (e.g., horizontally or at an angle) so that gravitational sedimentation counters an upward cross-flow 304 of gas. A channel 200 arranged in a drum could classify particles according to the centrifugal forces acting on the particles. A magnetic field could be employed to classify magnetic particles. A temperature difference between the two walls 302A and 302B would enable classification in terms of their thermophoretic migration velocities.

As illustrated in FIG. 3, particles with varying velocities may migrate out of the cross-flow 304 side entrance wall 302A and/or the cross-flow 304 side exit wall 302B. As illustrated, the varying size particles may migrate at different velocities thereby causing varying mobility separations wherein particular size particles remain in the channel 200 while other particles may be lost through or on the walls 302A/302B. For example, small particles may exit the channel through wall 302A, large particles may exit through wall 302B, and intermediate sizes may exit the channel 200 through the main outlet with the classified sample 110. Alternatively, in gravity based separations, the directions of large and small particles may be the opposite of that for electrical mobility separation.

In embodiments of the invention, the desired particles continue to migrate between the walls 302A and 302B of the cross flow migration classifier while others are lost as they deposit on or exit through the walls 302A and 302B. Accordingly, to provide continuous fractionation, separation may be achieved by the applied/imposed field 306 in the direction that is counter to the cross-flow 304, but orthogonal (or with an orthogonal component) to the walls 302A and 302B and the main direction of the sample flow 102. Such an arrangement will disperse the particles along the direction of the applied/imposed field 306. The cross-flow classifier continuously discharges (as a classified-sample flow 110) particles that migrate opposite and approximately equal to the cross-flow 304 without the imposition of any additional field being applied in the third direction (i.e., in the direction of the main flow 102).

The distribution of particles with respect to the appropriate migration (electrophoretic for charged particles in an electric field, magnetophoretic for magnetic particles in a magnetic field, thermophoretic in the presence of a temperature gradient, sedimentation for gravitational separations) can be determined by stepping either the applied/imposed field strength 306, or the cross-flow 304 rate through a range of values, and measuring the concentration of particles that is transmitted (i.e., particles that exit the channel 200 in the classified-sample flow 110). Accordingly, the migration for the particles in the flow 102 may be determined by slowly increasing/decreasing the cross-flow field 304 or the imposed field 306. By adjusting these in a stepwise fashion while measuring the particle concentration in the classified-sample flow 110, the migration of the particles in the flow 102 may be determined.

Alternatively, the cross-flow field 304 or flow 110 could be scanned continuously to determine the particle distribution. Knowledge of the size dependence of migration velocity or mobility and the applied field 306 and particle size would enable determination of the particle size distribution.

To allow even larger flows 110, multiple channels 200 may be arranged in parallel, with a single cross-flow 304 passing through the successive channels 200.

In addition, if the particles are allowed to migrate through the wall, provision may be taken to remove the particles from the cross flow so that that fluid can be recirculated. Such provisions may include filtration of the fluid after it exits the channel, and increasing the field strength or reducing the flow velocity (by increasing the cross sectional area of the flow) on the inlet side of the channel so that the applied field causes particles to continue to migrate until they reach a surface where they adhere or are otherwise removed from the fluid.

In addition to the above, in the case of electrophoretic migration, the classification could be achieved by alternating the potential on successive walls, enabling large volumetric flows to be separated without having to resort to unreasonably high voltages.

Details of Applied Field 306

As described above, the cross-flow classifier (CFC) may be implemented using any type of applied field 306. Electrical mobility classification of charged particles results when an appropriate electrical potential is maintained between the two porous electrodes. The electrophoretic migration velocity may be:

$$v_{mig} = ZE,$$

where Z=qB is the electrical mobility, q is the particle charge, and B is the mechanical mobility of the particles. For spherical particles in a gas, $$B = \frac{C_c(Kn)}{3\pi\mu D_p},$$

where $C_c(Kn)$ is the slip correction factor which is a function of the particle Knudsen number, $Kn=2\lambda/D_p$, the ratio of the mean-free-path of the gas molecules to the particle radius, and $\mu$ is the gas viscosity. For particles in a liquid, the fluid may be treated as a continuum so the slip correction factor Cc=1. For flat electrodes, the applied electric field is $$E = -\frac{\Phi}{b},$$

where $\Phi$ is the electrostatic potential (volts), and b is the separation distance between the two electrodes. The particles for which the migration velocity exactly counters the cross-flow 304 velocity, i.e., $Z^*E=-v$, move parallel to the electrodes, at least on average.

As in the DMA, particles with mobilities within a limited range will be transmitted through the CFC. For example, consider the geometry in which the cross-flow 304 is up, while particles undergo downward electrophoretic migration. For a channel 200 of height b, and length 1, the lowest mobility of particle that will be transmitted through the CFC corresponds to that which will migrate from the bottom of the channel 200 at the entrance to the top of the channel 200 at its exit, i.e., assuming plug flow, $$b = \left(v - \frac{Z_{min}\Phi}{b}\right)\frac{l}{U}$$

The highest mobility corresponds to the particle that will migrate from top to bottom, i.e., $$-b = \left(v - \frac{Z_{min}\Phi}{b}\right)\frac{l}{U}$$

This leads to a triangular transfer function like that found for the DMA when diffusion is unimportant. The range of mobilities that will lead to transmission with half the efficiency of particles of mobility Z* is $$\Delta Z_{50} = Z^* \frac{U}{v}\frac{b}{l}.$$

Noting that the total flow rate of aerosol entering the CFC is $$Q_a = \bar{U}bw,$$

and the volumetric flow rate of the cross-flow 304 (sheath flow) is $$Q_{sh} = vlw,$$

the resolving power of the CFC can be seen to be $$R = \frac{Q_{sh}}{Q} \equiv \frac{1}{\beta}.$$

Thus, as in the DMA, the maximum resolving power, or resolution, is determined by the ratio of the particle free flow to the aerosol flow. This simple analysis neglects particle diffusion that will allow some particles outside of these bounds to be transmitted while causing some of those that should be transmitted to be lost.

To quantify the effects of diffusion the convective diffusion for particles may be modeled as they flow and migrate within the channel 200. To accomplish such modeling, an understanding of the gas velocity field within the CFC is useful. For flat, parallel electrodes, the velocity distribution may be determined by solving the Navier-Stokes equations in Cartesian coordinates, i.e., $$v\frac{\partial u}{\partial y} = \nu\frac{\partial^2 u}{\partial y^2} - \frac{1}{\rho}\frac{\partial P}{\partial x}$$

noting that, for b<<1, the variation in u with x is much smaller than that with y, convection of momentum in the y direction dominates over that in the x direction. Nondimensionalizing with respect to the mean x velocity, $\bar{U}$, and the gap between the electrodes, b, the dimensionless streamwise velocity becomes $$\hat{u}(\hat{y}) = \frac{\dfrac{e^{Re\hat{v}\hat{y}} - e^{\frac{Re\hat{v}}{2}}}{2\sinh\left(\dfrac{Re\hat{v}}{2}\right)} + \dfrac{1}{2} - \hat{y}}{\dfrac{1}{Re\hat{v}} + \dfrac{1}{2} - \dfrac{e^{\frac{Re\hat{v}}{2}}}{2\sinh\left(\dfrac{Re\hat{v}}{2}\right)}},$$

where $\hat{y}$, $\hat{u}(\hat{y})$, and $\hat{v}$ are y/b, $u(y)/\bar{U}$, and $v/\bar{U}$, respecti the channel flow Reynolds number. The coordinate frame for this solution is defined such that $\hat{y}=0$ at the center of the channel 200, and the channel walls 302A/302B are located at $\hat{y}=\pm\frac{1}{2}$. The dimensionless length of the channel is $\hat{l}=l/b$.

To consider the distribution of particles with y at the entrance to the channel 200, it may be assumed that the particles are uniformly distributed across the channel flow, the dimensionless volumetric flow rate as a function of height is $$\hat{Q}(\hat{y}) = \int_{-\frac{1}{2}}^{\hat{y}} \hat{u}(\hat{y}')d\hat{y}' \frac{\dfrac{e^{Re\hat{v}\hat{y}} - e^{\frac{Re\hat{v}}{2}}}{2Re\hat{v}\sinh\left(\dfrac{Re\hat{v}}{2}\right)} - \dfrac{e^{\frac{Re\hat{v}}{2}\left(\frac{\hat{y}}{2}+\frac{1}{2}\right)}}{2\sinh\dfrac{Re\hat{v}}{2}} - \dfrac{\hat{y}^2}{4} + \dfrac{\hat{y}}{2} + \dfrac{3}{8}}{\dfrac{1}{Re\hat{v}} + \dfrac{1}{2} - \dfrac{e^{\frac{Re\hat{v}}{2}}}{2\sinh\dfrac{Re\hat{v}}{2}}}.$$

The particle concentration at the entrance to the channel 200 is assumed to be uniform. For a uniform cross-flow 304 with equal entering and exiting cross-flows 304, the dimensionless cross-flow velocity is v throughout the channel 200. Particle transport through the channel 200 is determined by a transport along the channel 200 with the mean fluid motion, a balance between the advection with the gas in the cross-flow direction and the counteracting migration, and Brownian diffusion. Neglecting inertial effects, the particle equations of motion may be written:

$$\frac{dx}{dt} = u(y) + u'$$

$$\frac{dy}{dt} = v - v_m + v'$$

where u' and v' respect the fluctuating velocity due to Brownian diffusion, respectively, and $v_m$ is the migration velocity of the particle in question. To determine the transmission efficiency as a function of the CFC, direct simulation of particle trajectories may be employed using a Monte Carlo approach.

The motion in a time step, dt is $$dx = u(y) + g(\sigma_x)$$

$$dy = v - v_m + g(\sigma_y)$$

where $\sigma_x^2 = \sigma_y^2 = 2Ddt$ is the variance in the particle motion due to Brownian motion, and $g(\sigma)$ denotes a random step subject to a Gaussian distribution of standard deviation $\sigma$. Cast in nondimensional terms, and denoting the migration velocity $v_m = v = v_m^*(Z = Z^*)$, the steps become:

$$d\hat{x} = \hat{u}(\hat{y})d\hat{t} + g(\hat{\sigma})$$

$$d\hat{y} = \hat{v}(1-\hat{Z})d\hat{t} + g(\hat{\sigma}).$$

The dimensionless mobility has been defined as the ratio of the particle mobility to $Z^*$, i.e., $\hat{Z} = Z/Z^*$. The dimensionless standard deviation is $$\hat{\sigma} = \frac{\sigma}{b} = \left(\frac{2Dt}{b^2}\right)^{\frac{1}{2}} = \left(2\frac{BkT}{bv_m^*}\frac{v^*}{U}\frac{\overline{U}t}{b}\right)^{\frac{1}{2}} = \left(\frac{2\hat{Z}\hat{v}\hat{t}}{Pe_{mig}}\right)^{\frac{1}{2}}$$

Scanning Cross-Flow Aerosol Migration Spectrometer

To measure a migration distribution with the cross-flow migration classifier, the potential difference across the gap between porous electrodes may be stepped. If the residence time in the DMA column is $\tau_{f,DMA}$, and the residence time in the downstream plumbing that connects the DMA to the detector is $\tau_{p,DMA}$, successive measurements at different applied field strengths may be separated by $\tau_{delay,DMA} = \tau_{f,DMA} + \alpha_p \tau_{p,DMA}$, where the multiplier $\alpha$ allows for the possibility that some particles are delayed in their transit due to nonuniform gas velocity profiles and recirculation regions. If the counting time is $\tau_c$, the duty cycle of the measurement is only:

$$f_{count} = \frac{\tau_c}{\tau_{f,DMA} + \alpha \tau_{p,DMA}}$$

With prior art instrumentation, most of the time is spent waiting, making the measurement slow and, when particle counts are low, statistical uncertainties are large. The duty-cycle of the conventional DMA may also be raised to near unity by continuously ramping the voltage applied to the DMA, and counting particles into successive time bins in the Scanning Electrical Mobility Spectrometer. Such an embodiment provides for performing full size distribution scans in as little as 30 seconds. However, the residence time distribution within CPCs used as detectors in the initial implementations in such a technique may severely distort the instrument response function unless scan time is increased to 45–60 seconds. Nonetheless, fast-response CPC and electrometer detectors may enable the time for size distribution measurements to be reduced to as little as 1 second.

While the present invention (which may include a Cross-Flow Mobility Classifier [CFMC]) may be well suited to stepping-mode operation, implementation of a scanning operation may be more difficult since the transmitted particles pass through the CFMC as a result of a balance between the transverse flow (i.e., flow 306) and the electrophoretic migration. However, changing the electric field strength in the simple CFMC may drastically reduce the transmission efficiency, unless the change is accomplished on a time scale that is long compared to the mean residence time in the classifier.

This limitation may be at least partially overcome by varying the transverse flow velocity with position in the streamwise direction to counteract the variation in the electrophoretic migration velocity due to the voltage ramp, or by varying the field strength with position along the length of the channel 200. In either case, the objective is to ensure that the particles of appropriate mobility are transmitted straight through the channel 200. One way of doing this may employ electrodes through which the pressure drop may vary with position. Using a porous metal electrode, e.g., sintered metal, or a honeycomb, the variation in v with x can be achieved by varying the thickness of the flow distribution element inversely as the field strength is varied, i.e., if a ramp of increasing voltage were to be used, the thickness would decrease with position along the channel so that a particle moving at the mean velocity along the channel length could be transmitted straight through the channel 200.

To enable a wide dynamic range of mobilities, an exponential voltage ramp may be used in the scanning DMA. For particles of a fixed mobility to move straight through the channel 200, the sum of the cross-flow 304 and migration velocities should be zero from the time the particle enters the channel 200 until it exits, i.e., $$v - \frac{Z\phi}{b} = 0$$

Assuming that the potential difference is $$\phi = \phi_0 e^{\pm \frac{\alpha x}{\overline{U}\tau}},$$

where $\phi_0$ is the potential at the time the particle enters the channel 200, the cross-flow velocity may vary with x as $$v(x) \approx \frac{Z\phi_0}{b} e^{\pm \frac{\alpha x}{\overline{U}\tau}}.$$

In deriving this expression, the motion of the particle along the channel 200 has been characterized in terms of the mean residence time of the fluid. A parameter $\alpha$ of order unity has been introduced to enable optimization of the scan rate to maximize particle transmission since particles will move at velocities centered about the mean velocity $\overline{U}$. Detailed numerical modeling of the flow and particle transport within the channel 200 may enable more rigorous optimization of the transmission and classification.

Another embodiment of the cross flow classifier may employ a field or cross-flow velocity that varies with position across the channel 200 allowing particles that migrate at different velocities to exit the channel 200 at different heights (assuming the cross flow direction is vertical). In one such implementation, the cross flow velocity variation may be achieved by using a wedge-shaped channel 200 in which the cross flow entrance permeable wall 302A is wider (or narrower) than that of the cross flow exit permeable wall 302B. Detection of particles according to that position, for example using light scattering and a linear array detector, would thus enable simultaneous detection and discrimination of particles with a range of sizes or migration velocities.

Logical Flow

Figure 4:
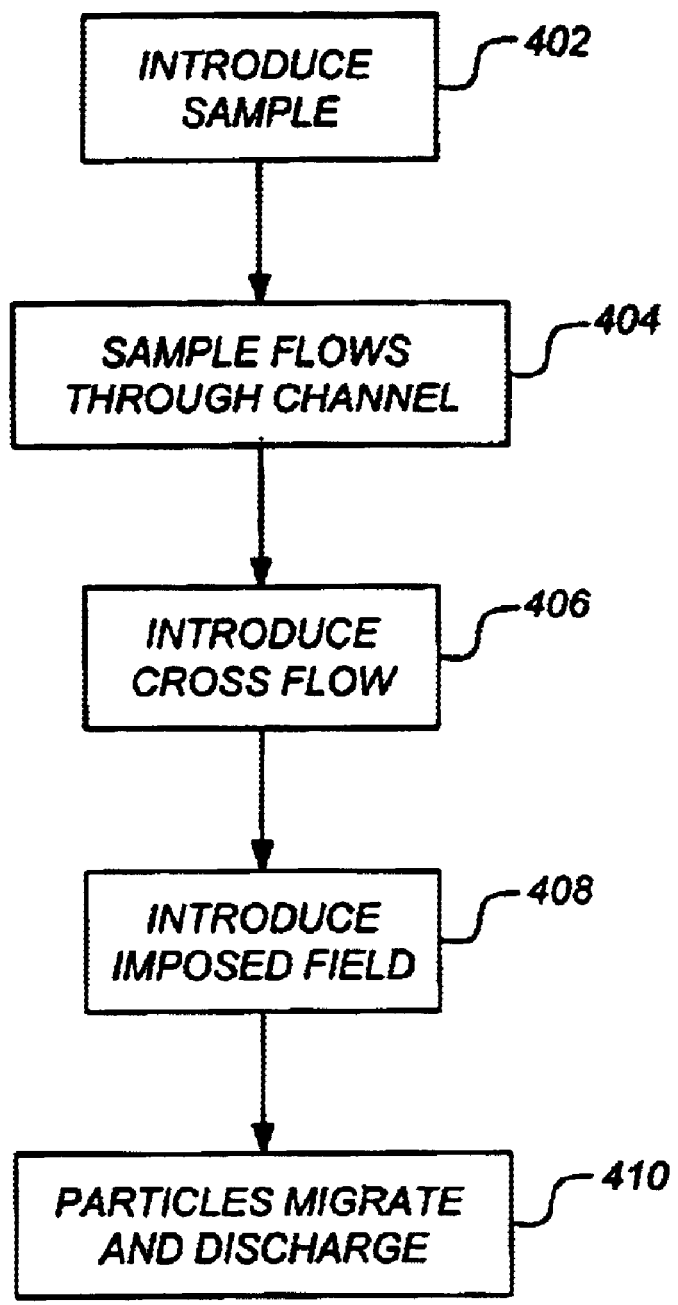
FIG. 4 is a flow chart illustrating the logical flow for separating particles in accordance with one or more embodiments of the invention.

FIG. 4 is a flow chart illustrating the logical flow for separating particles in accordance with one or more embodiments of the invention. Such particles may comprise molecules such as charged particles (i.e., ions) or macromolecules (that may enable thermophoretic separation). At step 402, a sample having one or more particles is introduced in a first direction to a channel 200. The sample 102 may be a variety of substances in a variety of forms. For example, the sample 102 may take the form of an aerosol, gas mixture, colloid, suspension of particles in liquid, or liquid solution. However, regardless, of the form, to maintain a high resolution, one or more embodiments may require that the sample flow be laminar. The channel 200 has two or more walls 302A/302B that are permeable to the flow of fluid (liquid or gas). Accordingly, the sample flows 102 through the channel 200 at step 404.

At step 406, a cross-flow 304 is introduced to the channel 200 through one of the permeable walls 302A/302B. The cross-flow 304 may also be a variety of substances in a variety of forms. For example, the cross-flow 304 may be a liquid, gas, solid, etc. The cross-flow 304 exits the channel 200 through another of the permeable walls 302A/302B. At step 408, an imposed field 306 is applied in a second direction that is counter to the cross-flow 304 and having an orthogonal component to the first direction (i.e., the direction of flow of the sample 102).

At step 410, the imposed field 306 causes particles in the sample 102 to migrate at a velocity that is opposite and/or approximately equal to the velocity of the cross-flow 304. Further, the particles remaining in the channel 200 (i.e., those particles that migrate opposite and/or approximately equal to the cross-flow 304) are continuously discharged. However, it should be noted that a range of migration velocities that may not be equal to the cross-flow may also be continuously discharged. Subsequent actions may then process and/or use the discharged particles 110.

While particles that remain in the flow through the channel 200 are continuously discharged, various other particles may be removed from the flow. For example, particles that reach the permeable walls 302A/302B may be removed from the flow through the channel 200 either by deposition on and adhesion to the walls 302A/302B or by passing through the walls 302A/302B.

In addition to above, the sample 102 may be pre-processed to enable more efficient separation/classification. For example, to classify fine particles, the particles in the sample 102 may first be charged and then classified in an imposed electric field. Alternatively, larger particles might be classified by gravity by altering the angle of inclination of the channel 200 (e.g., in a horizontal or inclined channel wherein the angle of inclination may be used to vary the field strength). By altering the angle of inclination, gravitational sedimentation may counter an upward cross-flow 304 of gas. In yet another embodiment, the channel 200 may be oriented in a drum that is capable of classifying the particles according to the centrifugal forces acting on the particles. Also, the imposed field 306 may be a magnetic field to classify magnetic particles. Further, the imposed field 306 may be imposed by providing a temperature difference between two of the channel walls 302A/302B, wherein the particles may be classified in terms of a thermophoretic migration velocity.

Embodiments of the invention are also capable of measuring/determining the distribution of particles with respect to their migration. In this regard, the concentration of discharged particles may be measured. Multiple measurements may be made while stepping a strength of the imposed field 306 or a rate of the cross-flow 304 through a range of values. Alternatively, the cross-flow 304 may be continuously scanned.

Larger flows of the classified sample may also be produced by arranging a one or more additional channels in parallel with the first channel 200. In such an arrangement, the cross-flow 304 may pass through both the first channel 200 and the additional channel(s). Further, to obtain/isolate classified particles as a purified sample, the transmitted sample be collected.

Conclusion

This concludes the description of the preferred embodiment of the invention. The following describes some alternative embodiments for accomplishing the present invention. For example, the samples and particles may be in a variety of forms such as aerosol, liquid, or aqueous solution. The cross flow and/or imposed field may also be in a variety of forms including, but not limited to, aerosols, liquids, or aqueous solutions. Accordingly, the invention may be used to separate/classify a large volume of particles and measure the distribution of particles within a sample with respect to their mobility/migration.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A cross-flow migration classifier comprising:
   a first channel through which a sample, having one or more particles, passes in a first direction, wherein the first channel comprises two or more walls that are permeable to a flow of fluid;
   a cross-flow that enters the channel through one of the permeable walls and exits through another of the permeable walls;
   an imposed field that is applied in a second direction that is counter to the cross-flow and having an orthogonal component to the first direction, wherein the imposed field causes one or more of the particles to migrate at a first velocity opposite and/or equal to a second velocity of the cross-flow,
   wherein the particles that migrate opposite to the cross flow are continuously discharged from the cross-flow migration classifier.

2. The cross-flow migration classifier of claim 1, wherein the one or more particles comprise one or more molecules.

3. The cross-flow migration classifier of claim 1, wherein particles that reach one or more of the permeable walls are removed from a flow through the first channel by deposition on and adhesion to one or more of the permeable walls.

4. The cross-flow migration classifier of claim 1, wherein particles that reach one or more of the permeable walls are removed from a flow through the first channel by passing through one or more of the permeable walls.

5. The cross-flow migration classifier of claim 1, wherein the sample comprises an aerosol.

6. The cross-flow migration classifier of claim 1, wherein the sample comprises a liquid.

7. The cross-flow migration classifier of claim 1, wherein the sample comprises a liquid solution.

8. The cross-flow migration classifier of claim 1, wherein the sample comprises a gaseous mixture.

9. The cross-flow migration classifier of claim 1, wherein the cross-flow comprises a liquid.

10. The cross-flow migration classifier of claim 1, wherein the cross-flow comprises a gas.

11. The cross-flow migration classifier of claim 1, wherein:
the particles in the sample are charged; and
the imposed field is an electric field.

12. The cross-flow migration classifier of claim 1, wherein the imposed field is provided by gravity and varied by altering an angle of inclination of the first channel.

13. The cross-flow migration classifier of claim 1, wherein the imposed field is provided using centrifugal forces in a drum.

14. The cross-flow migration classifier of claim 1, wherein the imposed field comprises a magnetic field.

15. The cross-flow migration classifier of claim 1, wherein:
the imposed field comprises a temperature difference between the two walls; and
the particles are classified in terms of a thermophoretic migration velocity.

16. The cross-flow migration classifier of claim 1, wherein distributions of the particles with respect to migration are determined by stepping a strength of the imposed field through a range of values and measuring a concentration of discharged particles.

17. The cross-flow migration classifier of claim 1, wherein distributions of the particles with respect to migration are determined by stepping a rate of the cross flow through a range of values and measuring a concentration of discharged particles.

18. The cross-flow migration classifier of claim 1, wherein the cross-flow is continuously scanned to determine a distribution of the particles.

19. The cross-flow migration classifier of claim 1, further comprising a second channel arranged in parallel with the first channel wherein the cross-flow pass through the first channel and the second channel.

20. A method for separating particles comprising:
introducing a sample, having one or more particles, in a first direction to a first channel, wherein the first channel comprises two or more walls that are permeable to a flow of fluid;
introducing a cross-flow to the channel through one of the permeable walls, wherein the cross-flow exits through another of the permeable walls;
applying an imposed field in a second direction that is counter to the cross-flow and having an orthogonal component to the first direction, wherein the imposed field causes one or more of the particles to migrate at a first velocity opposite and/or equal to a second velocity of the cross-flow; and
continuously discharging the particles that migrate opposite to the cross flow.

21. The method of claim 20, wherein the one or more particles comprise one or more molecules.

22. The method of claim 20, wherein particles that reach one or more of the permeable walls are removed from a flow through the first channel by deposition on and adhesion to one or more of the permeable walls.

23. The method of claim 20, wherein particles that reach one or more of the permeable walls are removed from a flow through the first channel by passing through one or more of the permeable walls.

24. The method of claim 20, wherein the sample comprises an aerosol.

25. The method of claim 20, wherein the sample comprises a colloid or suspension of particles in a liquid.

26. The method of claim 20, wherein the sample comprises a liquid solution.

27. The method of claim 20, wherein the sample comprises a gas mixture.

28. The method of claim 20, wherein the cross-flow comprises a liquid.

29. The method of claim 20, wherein the cross-flow comprises a gas.

30. The method of claim 20, further comprising charging the particles in the sample, and wherein the imposed field is an electric field.

31. The method of claim 20, wherein the imposed field is applied by gravity and varied by altering an angle of inclination of the first channel.

32. The method of claim 20, wherein the imposed field is applied using centrifugal forces in a drum.

33. The method of claim 20, wherein the imposed field comprises a magnetic field.

34. The method of claim 20, wherein:
the imposed field comprises a temperature difference between the two walls; and
the particles are classified in terms of a thermophoretic migration velocity.

35. The method of claim 20, further comprising stepping a strength of the imposed field through a range of values and measuring a concentration of discharged particles.

36. The method of claim 20, further comprising stepping a rate of the cross flow through a range of values and measuring a concentration of discharged particles.

37. The method of claim 20, further comprising continuously scanning the cross-flow to determine a distribution of the particles.

38. The method of claim 20, further comprising arranging a second channel in parallel with the first channel wherein the cross-flow pass through the first channel and second channel.

39. An apparatus for separating particles comprising:
means for introducing a sample, having one or more particles, in a first direction to a first channel, wherein the first channel comprises two or more walls that are permeable to a flow of fluid;
means for introducing a cross-flow to the channel through one of the permeable walls, wherein, the cross-flow exits through another of the permeable walls;
means for applying an imposed field in a second direction that is counter to the cross-flow and having an orthogonal component to the first direction, wherein the imposed field causes one or more of the particles to migrate at a first velocity opposite and/or equal to a second velocity of the cross-flow; and
means for continuously discharging the particles that migrate opposite to the cross flow.

40. The apparatus of claim 39, wherein the one or more particles comprise one or more molecules.

41. The apparatus of claim 39, wherein particles that reach one or more of the permeable walls are removed from a flow through the first channel by deposition on and adhesion to one or more of the permeable walls.

42. The apparatus of claim 39, wherein particles that reach one or more of the permeable walls are removed from a flow through the first channel by passing through one or more of the permeable walls.

43. The apparatus of claim 39, wherein the sample comprises an aerosol.

44. The apparatus of claim 39, wherein the sample comprises a liquid.

45. The apparatus of claim 39, wherein the sample comprises a liquid solution.

46. The apparatus of claim 39, wherein the sample comprises a gas mixture.

47. The apparatus of claim 39, wherein the cross-flow comprises a liquid.

48. The apparatus of claim 39, further comprising means for charging the particles in the sample, and wherein the imposed field is an electric field.

49. The apparatus of claim 39, wherein the imposed field is applied by gravity and varied by altering an angle of inclination of the first channel.

50. The apparatus of claim 39, wherein the imposed field is applied using centrifugal forces in a drum.

51. The apparatus of claim 39, wherein the imposed field comprises a magnetic field.

52. The apparatus of claim 39, wherein:

the imposed field comprises a temperature difference between the two walls; and the particles are classified in terms of a thermophoretic migration velocity.

53. The apparatus of claim 39, further comprising means for stepping a strength of the imposed field through a range of values and measuring a concentration of discharged particles.

54. The apparatus of claim 39, further comprising means for stepping a rate of the cross flow through a range of values and measuring a concentration of discharged particles.

55. The apparatus of claim 39, further comprising means for continuously scanning the cross-flow to determine a distribution of the particles.

56. The apparatus of claim 39, further comprising means for arranging a second channel in parallel with the first channel wherein the cross-flow pass through the first channel and second channel.

* * * * *